March 28, 1961 P. T. HOULDCROFT ET AL 2,977,457
WELDING NOZZLES
Filed July 23, 1958 2 Sheets-Sheet 1
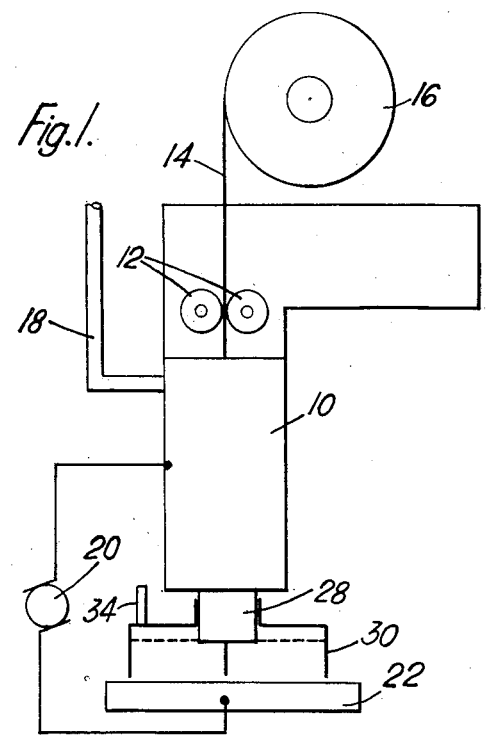
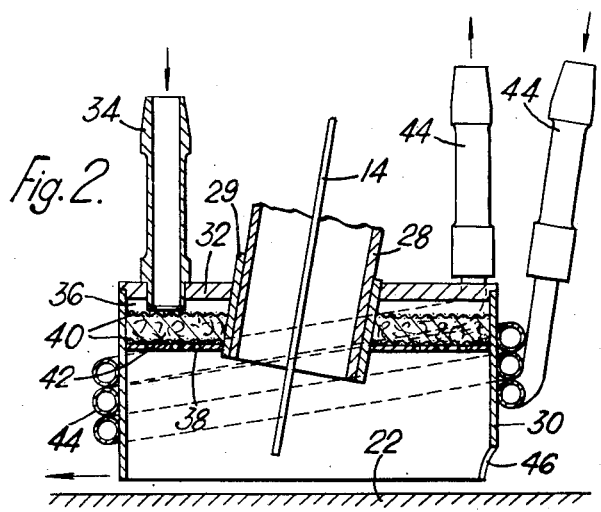
Inventors
PETER THOMAS HOULDCROFT &
ARTHUR ALFRED SMITH
Attorneys March 28, 1961   P. T. HOULDCROFT ET AL   2,977,457
WELDING NOZZLES
Filed July 23, 1958   2 Sheets-Sheet 2

Inventors
PETER THOMAS HOULDCROFT &
ARTHUR ALFRED SMITH
Attorneys

United States Patent Office 2,977,457
Patented Mar. 28, 1961

2,977,457
WELDING NOZZLES

Peter Thomas Houldcroft and Arthur Alfred Smith, Cambridge, England, assignors, by mesne assignments, to National Research Development Corporation, London, England, a corporation of Great Britain Filed July 23, 1958, Ser. No. 750,445

Claims priority, application Great Britain July 23, 1957

5 Claims. (Cl. 219—74)

In the gas-shielded metal-arc welding process, difficulties are frequently experienced when high welding currents are used. With aluminium alloys for example, the weld pool becomes excessively turbulent above about 350 amps. welding current and the resultant weld bead is subject to gross deep-seated porosity or severe oxide entrainment known as "puckering." While modifications in welding technique, such as angling the torch to reduce the vertical component of velocity of metal transfer, can raise the limit of safe welding slightly, the effect cannot be prevented.

Since the damage was apparently caused by the ingress of air to the weld pool and arc, the applicants have carried out experiments with gas shielding and have shown that for high-current welding it is necessary to modify the method of shielding the electrode and that with a suitably designed nozzle unit, the shielding at high currents can be improved and the defects referred to can be greatly reduced. In the absence of entrained air, oxides cannot form and the metal always "wets" perfectly, giving a smooth sound weld bead. Spatter is also reduced. The severe turbulence and digging action of the arc, which is aggravated by the presence of the entrained air, is greatly reduced with improved shielding and penetration is uniform and readily controlled.

The present practice in welding with the inert-gas metal-arc consumable electrode process is to use simple cylindrical nozzles concentric with the welding wire to direct the flow of inert gas round the arc and over the weld pool. These nozzles are usually ½" to ¾" in diameter and are used so that the gap between the nozzle and the workpiece is about ½".

The invention provides a method of welding with high currents using the gas-shielded metal-arc consumable electrode process, in which as the consumable electrode is advanced from a welding nozzle towards the workpiece, a primary flow of shielding gas is directed through the nozzle towards the workpiece, forming a shield around the electrode, and a secondary supply of shielding gas outside the nozzle is caused to flow past the end of the nozzle towards the workpiece, the secondary shielding gas enclosing at least the major portion of the end of the nozzle, including the leading edge of the latter, the shield provided by the secondary shielding gas covering an area of at least three times the width of the weld pool.

The invention also provides an auxiliary nozzle assembly for a welding gun or welding head comprising a nozzle adapter device to be fitted to the gun or head so that a consumable electrode and a primary flow of shielding gas will pass through the device when the gun or head is in use. An auxiliary nozzle arranged round the nozzle device includes an annular or part-annular channel extending round the nozzle device, and means are provided for conducting a secondary flow of shielding gas into the annular or part-annular channel. At the end which is directed towards the workpiece, the auxiliary nozzle is provided with an opening or a number of apertures communicating with the channel, whereby the secondary shielding gas flows towards the workpiece and forms a shield extending round at least the major portion of the nozzle device, including the leading edge of the latter.

Preferably the auxiliary nozzle into which the secondary shielding gas flows is provided with diffusing means to distribute more evenly the secondary shielding gas.

In order that the invention may be better understood, two embodiments thereof will now be described by way of example, with reference to the accompanying drawings, in which:

Figure 1 shows diagrammatically a welding head employing an auxiliary nozzle assembly according to the invention;

Figure 2 is a sectional view of a first auxiliary nozzle assembly according to the invention;

Figure 3:
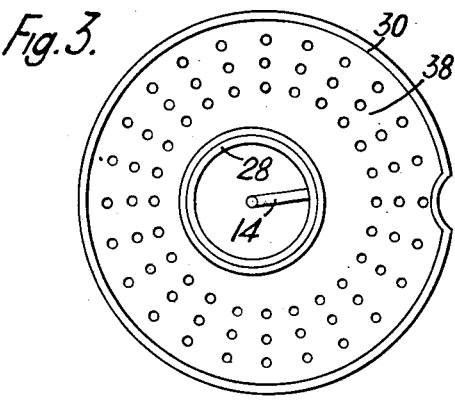
Figure 3 is a bottom view of the assembly of Figure 2.

In Figure 1, the welding head 10 is provided with a pair of rollers 12 between which passes a wire 14, which constitutes a consumable welding electrode and which is drawn from the roll 16. A shielding gas, which in the description to follow will be assumed to be argon, is fed into the head through the tube 18 to form a protective shield around the electrode wire, and a generator 20 is connected between the head and the workpiece 22. The auxiliary nozzle provided according to the present invention is shown diagrammatically at 30, together with its inlet tube 34 for an auxiliary supply of argon.

Figure 2 is a detailed view of an auxiliary nozzle assembly according to the invention.

The primary supply of argon flows down the nozzle 28 of the welding head towards the workpiece 22 when the welding head is in use, forming a gaseous barrier protecting the electrode wire 14 from the atmosphere. The nozzle 28, which fits into a nozzle device or adapter 29, is surrounded by a box formed by an annular shield 30 of brass having one end closed by a plate 32 and the other end open, the latter end facing the workpiece 22. A secondary supply of argon is fed through the plate 32 by means of a conduit 34, and enters a compartment 36 of the box formed between the plate 32 and a perforated plate 38 of thick copper. Within this compartment is a pad of wire gauze 40 and quartz wool 42 which serves to diffuse the gas entering from the conduit 34 and to prevent the passage of high velocity gas streams which might produce turbulence and cause air entrainment. After passing through the diffusing compartment 36, the gas enters the main compartment of the shield 30 through the perforations in the plate 38, which also serves to protect the diffusing pad from the heat radiated from the workpiece and from the spatter. The perforations in the plate 38 are arranged radially, as shown in Figure 3, in order to provide the minimum of obstruction to the passage of heat from the inner edge of the plate to its periphery.

The annular shield 30 is provided with a cooling tube 44 which makes a number of turns round the shield 30 and through which water is forced during the use of the welding head. In this embodiment, the nozzle 28 is tilted to make the angle between the electrode wire and the deposited bead surface less than 90°. The recess 46 is formed in the shield 30 to ensure that the rear edge of the latter will not be obstructed by the deposited weld bead.

Using this auxiliary nozzle assembly, it was found that the secondary shielding gas prevented the ingress of air and that at welding currents of the order of 500 amps. the arc was steady. In one example, a primary nozzle of ¾" diameter was used to supply 65 cubic feet per hour of primary argon, while the secondary argon flow rate was 50 cubic feet per hour. With such an arrangement pure aluminium plate of one inch thickness was satisfactorily butt welded at 500 amps. in two passes at a welding speed of 12 inches per minute.

Figure 4:
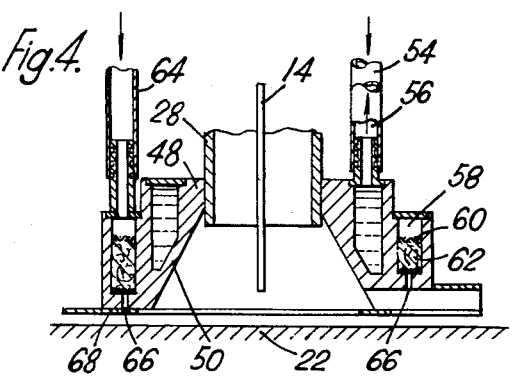
Figure 4 shows in cross-section a further auxiliary nozzle assembly according to the invention.
Figure 5:
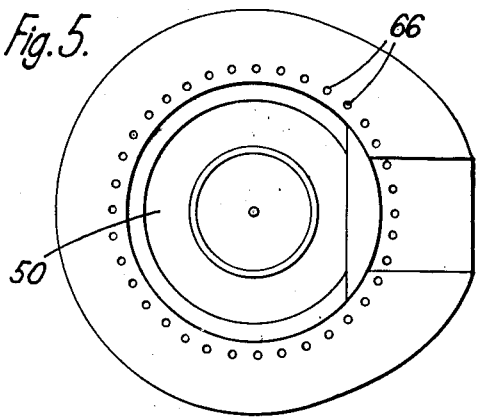
Figure 5 is a bottom view of the assembly of Figure 4.

A further embodiment of the invention is shown in Figures 4 and 5. In this embodiment, the auxiliary nozzle 48 has a part-conical inner wall 50 within which the primary argon flows downwards to the workpiece 22. Within the auxiliary nozzle 48 is formed a first annular channel 52 which is for cooling purposes and connects with water inlet and outlet tubes 54 and 56 respectively, and a second annular channel 58 which contains the diffusing pad of wire gauze 60 and quartz wool 62. The annular chamber 58 is provided with an argon inlet tube 64 and has perforations 66 in its lower face 68 to enable the secondary argon from the tube 64 to flow out towards the workpiece. The smaller volume of the chamber 58 results in a reduction of the time required to remove all air from this chamber (by starting the secondary argon flow) when a weld run is to be made. The termination of the auxiliary nozzle 48 may be trumpet-shaped instead of part-conical.

If desired, the auxiliary nozzle can be so constructed that the secondary shielding gas emerges from a continuous circular slot formed in its lower face. In one embodiment, the ring of holes shown in Figures 4 and 5 is raised from the base of the assembly, and the secondary shielding gas passes first through the ring of holes and then through the circular slot.

Although the improvement resulting from the use of this nozzle is most marked when welding aluminum, tests have indicated that with other metals, e.g. steel, porosity due to entrained air can also be prevented. The nozzle is also useful when welding in the open air, as it gives protection from draughts.

The protection of the leading edge of the weld pool by the secondary shield is particularly important. In some cases it is possible to use a nozzle assembly which does not provide a secondary shield in the neighbourhood of the trailing edge of the nozzle.

We claim:

1. A method of welding a workpiece with high currents using the gas-shielded metal-arc consumable electrode process, comprising advancing the consumable electrode through a welding nozzle towards the workpiece, directing a primary flow of inert gas through the welding nozzle in the direction of the workpiece, the primary gas forming a shield around the electrode, advancing a secondary flow of inert shielding gas through a second nozzle within which the first nozzle is located, confining the secondary shielding gas within the second nozzle at least as far as the end of the first nozzle, and directing the secondary shielding gas towards the workpiece so that all of the secondary gas leaves the second nozzle at different points around the latter is travelling along paths which are substantially non-convergent and surrounds the surface of the workpiece around the weld pool over an area having a width at least three times the width of the weld pool.

2. An auxiliary nozzle assembly for a welding device for use in the gas-shielded metal-arc consumable electrode welding process comprising an inner tubular part for fitting over the discharge nozzle of a welding device for the passage of a consumable electrode and a primary flow of shielding gas, an outer wall outside said inner tubular part, a diffusing chamber within said outer wall and extending around said inner tubular part, a diffusing pad of fibrous material within said diffusing chamber, said diffusing chamber further comprising an inlet for receiving a secondary gaseous flow of shielding gas and an apertured outlet plate through which the secondary shielding gas is directed towards the work piece to form a gaseous shield around at least the major portion, including the leading edge of the primary gas outlet, said assembly further comprising means for circulation of liquid coolant to remove heat from the assembly.

3. Welding apparatus for use in the gas-shielded metal-arc consumable electrode process comprising an inner welding nozzle, means for feeding a consumable electrode through the inner nozzle, means for conducting a primary gaseous stream of inert monatomic shielding gas to the inner nozzle to form a gaseous shield around the electrode, an outer wall extending around said inner nozzle, a diffusing chamber within said outer wall and extending around said inner nozzle, means for delivering a secondary gaseous flow of inert monatomic shielding gas into said diffusing chamber, secondary gas discharge means extending at least as far as the end of said inner nozzle, for directing gas from said diffusing chamber towards the work piece to form a shield extending round at least the major portion of said inner nozzle, including the leading edge of the latter, and means for conducting a liquid coolant around said outer wall and diffusing chamber.

4. A method of welding a work piece with high currents using the gas-shielded metal-arc consumable electrode process comprising advancing the consumable electrode through a first welding nozzle towards the work piece, directing a primary gaseous flow of inert monatomic shielding gas through said nozzle to form a shield around said electrode, advancing a secondary gaseous flow of inert monatomic shielding gas through a second nozzle within which the first nozzle is located, passing the secondary gaseous flow through a diffusing chamber within said second nozzle, conducting the secondary flow from the diffusing chamber through a perforated plate, confining the secondary shielding gas within the second nozzle at least as far as the end of the first nozzle, and directing the secondary shielding gas towards the work piece so that the streams of secondary gas which leave the second nozzle at different points around the latter are travelling along paths which are substantially non-convergent, and cooling the second nozzle and diffusing chamber by means of a liquid coolant.

5. An auxiliary nozzle assembly according to claim 2, in which the diffusing pad is composed of wire gauze and quartz wool.

References Cited in the file of this patent

UNITED STATES PATENTS

| | | |
|---|---|---|
| 1,309,696 | Roberts et al. | July 15, 1919 |
| 2,522,482 | Olzak | Sept. 12, 1950 |
| 2,590,084 | Bernard | Mar. 25, 1952 |
| 2,686,860 | Buck et al. | Aug. 17, 1954 |
| 2,819,383 | Johnston | Jan. 7, 1958 |
| 2,918,563 | Ternisien et al. | Dec. 22, 1959 |

FOREIGN PATENTS

| | | |
|---|---|---|
| 863,983 | France | Jan. 8, 1941 |